(12) United States Patent
Dar et al.

(10) Patent No.: US 12,561,397 B2
(45) Date of Patent: Feb. 24, 2026

(54) MACHINE LEARNING SYSTEM AND METHOD OF DETECTING IMPACTFUL PERFORMANCE ANOMALIES

(71) Applicant: Dell Products L.P., Round Rock, TX (US)

(72) Inventors: Shaul Dar, Petach Tikva (IL); Avitan Gefen, Tel Aviv (IL)

(73) Assignee: Dell Products L.P., Round Rock, TX (US)

( * ) Notice: Subject to any disclaimer, the term of this patent is extended or adjusted under 35 U.S.C. 154(b) by 1073 days.

(21) Appl. No.: 17/579,769

(22) Filed: Jan. 20, 2022

(65) Prior Publication Data

US 2023/0229733 A1     Jul. 20, 2023

(51) Int. Cl.
G06F 18/10       (2023.01)
G06F 11/34       (2006.01)
G06F 18/214      (2023.01)
G06N 20/20       (2019.01)

(52) U.S. Cl.
CPC .......... G06F 18/10 (2023.01); G06F 11/3409 (2013.01); G06F 18/214 (2023.01); G06N 20/20 (2019.01)

(58) Field of Classification Search
CPC .... G06F 18/10; G06F 18/214; G06F 11/3409; G06N 20/20
USPC .......................................................... 706/45
See application file for complete search history.

(56) References Cited

U.S. PATENT DOCUMENTS

| | | | | |
|---|---|---|---|---|
| 9,324,022 | B2 * | 4/2016 | Williams, Jr. ......... | G06N 3/045 |
| 2021/0144517 | A1 * | 5/2021 | Guim Bernat ........ | G06F 9/5072 |
| 2023/0186170 | A1 * | 6/2023 | Akbiyik ............... | G06F 11/008 |
| | | | | 706/12 |

OTHER PUBLICATIONS

ICDM '08: Proceedings of the 2008 Eighth IEEE International Conference on Data Mining, IEEE Computer Society, pp. 413-422.

(Continued)

*Primary Examiner* — Tsu-Chang Lee
(74) *Attorney, Agent, or Firm* — BainwoodHuang

(57) ABSTRACT

Techniques for detecting impactful performance anomalies in storage systems. The techniques include obtaining, for each performance metric of a storage system's workload, a training set of series diffs based on a threshold. Each diff represents a difference between an observed value from an observed set of time series values for the performance metric and a normalized value from a corresponding set of normalized time series values. The techniques include applying the training set of series diffs for each performance metric to an unsupervised anomaly detection algorithm and running the algorithm to identify potentially impactful anomalies in a multi-dimensional search space. The techniques include identifying impactful anomalies from among the potentially impactful anomalies that exceed an anomaly score. In this way, impactful anomalies having a causal effect on multiple performance metrics of the storage system's workload can be identified in a manner less complex and less costly than prior multivariate approaches.

19 Claims, 5 Drawing Sheets

(56)     References Cited

OTHER PUBLICATIONS

SIGKDD 2019, pp. 1-30 (PowerPoint slides).
KDD '20: Proceedings of the 26th ACM SIGKDD International
Conference on Knowledge Discovery & Data Mining, Aug. 2020,
pp. 3395-3404.
Pattern Recognition, vol. 74, Feb. 2018, pp. 406-421.
SIGKDD '19: Proceedings of the 25th ACM SIGKDD International
Conference on Knowledge Discovery & Data Mining, Jul. 2019, pp.
2828-2837.

\* cited by examiner

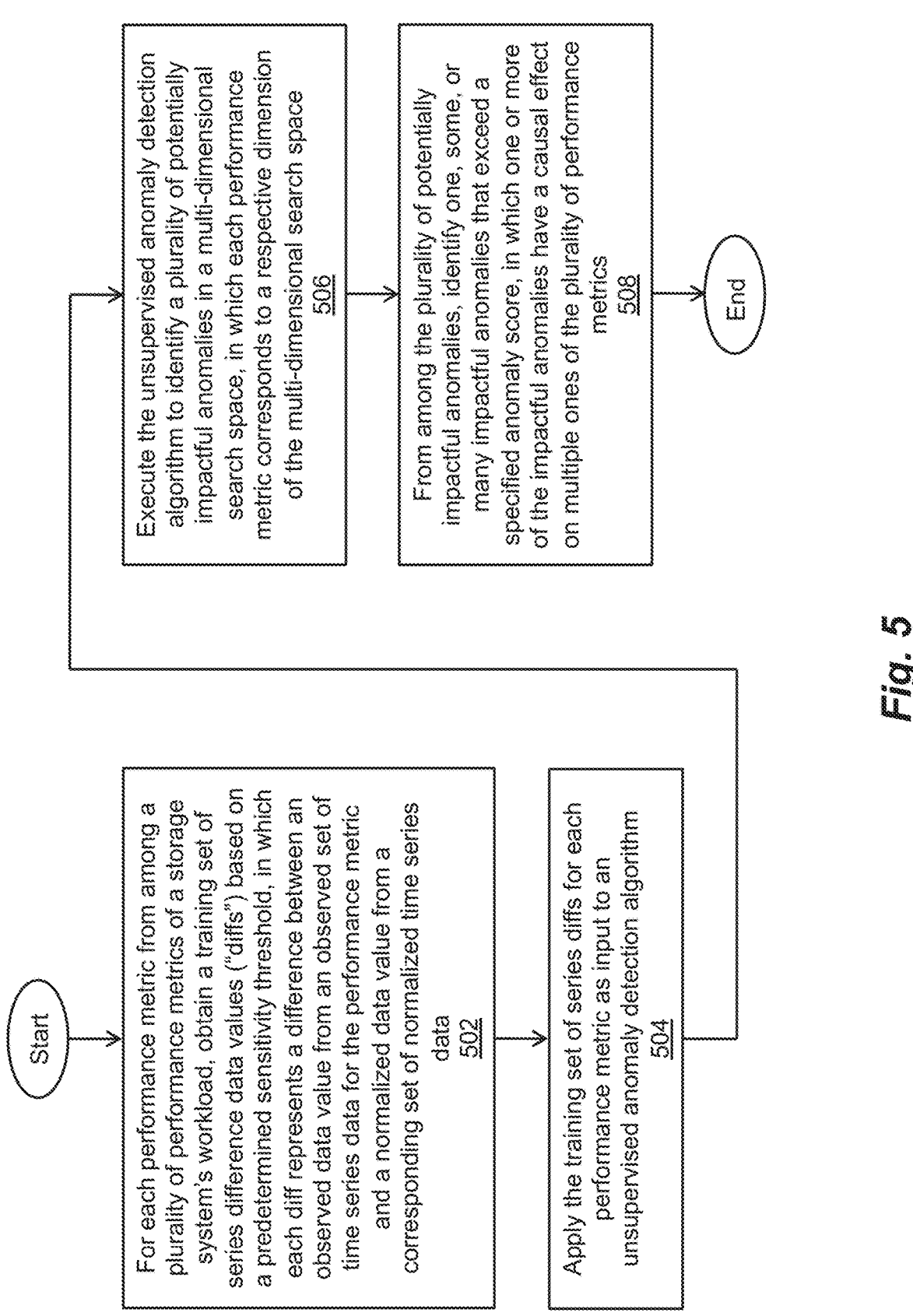

Start

For each performance metric from among a plurality of performance metrics of a storage system's workload, obtain a training set of series difference data values ("diffs") based on a predetermined sensitivity threshold, in which each diff represents a difference between an observed data value from an observed set of time series data for the performance metric and a normalized data value from a corresponding set of normalized time series data
502

Apply the training set of series diffs for each performance metric as input to an unsupervised anomaly detection algorithm
504

Execute the unsupervised anomaly detection algorithm to identify a plurality of potentially impactful anomalies in a multi-dimensional search space, in which each performance metric corresponds to a respective dimension of the multi-dimensional search space
506

From among the plurality of potentially impactful anomalies, identify one, some, or many impactful anomalies that exceed a specified anomaly score, in which one or more of the impactful anomalies have a causal effect on multiple ones of the plurality of performance metrics
508

End

Fig. 5

MACHINE LEARNING SYSTEM AND METHOD OF DETECTING IMPACTFUL PERFORMANCE ANOMALIES

BACKGROUND

Workloads running on a storage system generally exhibit different performance profiles over time. To evaluate the behavior of a workload, measurements are typically made at regular time intervals with respect to one or more performance metrics, such as the latency of the workload, the input/output operations per second (IOPS) of the workload, the bandwidth of the workload, and so on. A sequence of such measurements is referred to herein as a "time series." To determine whether any of the performance metrics exhibit anomalies, a univariate anomaly detection technique may be performed to process the time series for each performance metric and identify those anomalies that exceed a specified threshold for the performance metric over a specified reference interval. The identified anomalies for each performance metric may be analyzed or investigated to determine whether they indicate a hardware failure, a software failure, a resource contention, an inappropriate configuration of the storage system, an improper usage of the storage system by a customer or application, a security concern, a change in one or more of the workloads, and so on.

SUMMARY

Unfortunately, performing a univariate anomaly detection technique (also referred to herein as the "univariate technique(s)") to determine whether performance metrics of a storage system's workload exhibit anomalies has several drawbacks. For example, such a univariate technique can identify hundreds if not thousands of anomalies over the course of one or more days, making it difficult and costly to determine which ones of the multitude of anomalies might significantly and adversely impact the storage system. Such a univariate technique can be supplemented with logic or rules regarding potentially impactful anomalies, such as identifying those anomalies that fall outside a normal range by a specified amount over a specified reference interval or are characterized by a fall in one performance metric (e.g., IOPS) coupled with a rise in another performance metric (e.g., latency). However, such logic or rules for identifying impactful anomalies can be arbitrary, inaccurate, and/or incomplete, and ultimately unhelpful to a customer of the storage system. Further, such a univariate technique operates on just one performance metric at a time. However, impactful anomalies can often have a causal effect on more than one performance metric, making a multivariate approach to anomaly detection more appropriate. However, multivariate anomaly detection techniques are generally complex and costly to implement due to their use of deep learning technology, graphical processing units (GPUs), and so on.

Techniques are disclosed herein for detecting impactful performance anomalies using machine learning (ML). The disclosed techniques can be employed in storage systems, as well as intrusion detection systems, fraud detection systems, fault detection systems, system health monitoring systems, systems for detecting events in sensor networks, systems for detecting defects in images, or any other suitable systems subject to anomalies. The disclosed techniques can be performed in multiple stages, namely, a univariate stage and a multivariate stage. The univariate stage can include collecting or sampling, at regular time intervals, a plurality of performance metrics of a system's workload and generating and observing a set of unlabeled time series data (also referred to herein as the "observed data") for each performance metric. The univariate stage can further include normalizing the observed data values for each performance metric to generate a set of normalized time series data (also referred to herein as the "normalized data") for the performance metric. The univariate stage can further include obtaining, for each performance metric, a training set of series difference data values (such difference data values also referred to herein as "diffs") based on a sensitivity threshold, in which each diff in the training set represents a difference between an observed data value from the observed set of time series data for the performance metric and a normalized data value from the corresponding set of normalized time series data.

Having performed the univariate stage, the multivariate stage can be performed by applying the training set of series diffs for each performance metric as input to an unsupervised anomaly detection algorithm, such as an isolation forest algorithm or any other suitable anomaly detection algorithm. The multivariate stage can include executing the isolation forest algorithm to detect, flag, or identify a plurality of potentially impactful anomalies in a multi-dimensional search space, in which each performance metric corresponds to a respective dimension of the multi-dimensional search space. The multivariate stage can further include detecting, flagging, or identifying one, some, or many impactful anomalies from among the plurality of potentially impactful anomalies that exceed an anomaly score, which can correspond (or be proportional) to a sensitivity threshold employed in the univariate stage or any other suitable threshold. Such a sensitivity threshold can be a dynamic threshold, which can be learned from time series data using any suitable data smoothing technique or algorithm. In this way, impactful anomalies having a causal effect on multiple performance metrics of a system's workload can be identified in a manner that is less complex and less costly than prior multivariate approaches, as well as more helpful to a customer of the system.

In certain embodiments, a method of detecting performance anomalies using machine learning includes, for each performance metric from among a plurality of performance metrics of a workload of a system, obtaining a training set of difference data values based on a sensitivity threshold. Each difference data value represents a difference between an observed data value from a set of time series observed data for the performance metric and a normalized data value from a set of time series normalized data for the performance metric. The method further includes applying the training set of difference data values for each performance metric as input to an unsupervised anomaly detection algorithm and executing the unsupervised anomaly detection algorithm to identify a plurality of potential anomalies in a multi-dimensional search space. Each performance metric corresponds to a respective dimension of the multi-dimensional search space. The method further includes identifying, from among the plurality of potential anomalies, one or more anomalies that exceed an anomaly score, in which one or more of the identified anomalies have a causal effect on multiple ones of the plurality of performance metrics.

In certain arrangements, the method further includes dynamically learning the sensitivity threshold by applying a data smoothing algorithm to the set of time series observed data.

3 4

In certain arrangements, the method further includes generating identifying information of the identified anomalies for use in one or more automated actions associated with the system.

In certain arrangements, the method further includes, for each performance metric, sampling the performance metric at regular time intervals over a course of a specified period to generate the set of time series observed data.

In certain arrangements, the method further includes, for each performance metric, normalizing the set of time series observed data to generate the set of time series normalized data.

In certain arrangements, the method further includes tabularizing the difference data values for each performance metric to generate a table containing the difference data values for each performance metric.

In certain arrangements, the method further includes applying the difference data values contained in the table as input to the unsupervised anomaly detection algorithm, in which the table includes a plurality of columns, and each column contains the difference data values for a respective one of the plurality of performance metrics.

In certain arrangements, the method further includes executing the unsupervised anomaly detection algorithm against the difference data values contained in the table.

In certain embodiments, a system for detecting performance anomalies using machine learning includes a memory and processing circuitry configured to execute program instructions out of the memory, for each performance metric from among a plurality of performance metrics of a workload of a system, to obtain a training set of difference data values based on a sensitivity threshold. Each difference data value represents a difference between an observed data value from a set of time series observed data for the performance metric and a normalized data value from a set of time series normalized data for the performance metric. The processing circuitry is further configured to execute the program instructions out of the memory to apply the training set of difference data values for each performance metric as input to an unsupervised anomaly detection algorithm and execute the unsupervised anomaly detection algorithm to identify a plurality of potential anomalies in a multi-dimensional search space. Each performance metric corresponds to a respective dimension of the multi-dimensional search space. The processing circuitry is further configured to execute the program instructions out of the memory to identify, from among the plurality of potential anomalies, one or more anomalies that exceed an anomaly score, in which one or more of the identified anomalies have a causal effect on multiple ones of the plurality of performance metrics.

In certain arrangements, the processing circuitry is further configured to execute the program instructions out of the memory to dynamically learn the sensitivity threshold by applying a data smoothing algorithm to the set of time series observed data.

In certain arrangements, the anomaly score corresponds or is proportional to the dynamically learned sensitivity threshold.

In certain arrangements, the processing circuitry is further configured to execute the program instructions out of the memory to generate identifying information of the identified anomalies for use in one or more automated actions associated with the system.

In certain arrangements, the processing circuitry is further configured to execute the program instructions out of the memory, for each performance metric, to sample the performance metric at regular time intervals over a course of a specified period to generate the set of time series observed data.

In certain arrangements, the processing circuitry is further configured to execute the program instructions out of the memory, for each performance metric, to normalize the set of time series observed data to generate the set of time series normalized data.

In certain arrangements, the processing circuitry is further configured to execute the program instructions out of the memory to tabularize the difference data values for each performance metric to generate a table containing the difference data values for each performance metric.

In certain arrangements, the processing circuitry is further configured to execute the program instructions out of the memory to apply the difference data values contained in the table as input to the unsupervised anomaly detection algorithm. The table includes a plurality of columns, in which each column contains the difference data values for a respective one of the plurality of performance metrics.

In certain arrangements, the processing circuitry is further configured to execute the program instructions out of the memory to execute the unsupervised anomaly detection algorithm against the difference data values contained in the table.

In certain arrangements, the unsupervised anomaly detection algorithm corresponds to an isolation forest algorithm.

In certain arrangements, the sensitivity threshold corresponds to a number of standard deviations from a norm of the time series observed data for the performance metric.

In certain embodiments, a computer program product includes a set of non-transitory, computer-readable media having instructions that, when executed by processing circuitry, cause the processing circuitry to perform a method including, for each performance metric from among a plurality of performance metrics of a workload of a system, obtaining a training set of difference data values based on a sensitivity threshold. Each difference data value represents a difference between an observed data value from a set of time series observed data for the performance metric and a normalized data value from a set of time series normalized data for the performance metric. The method further includes applying the training set of difference data values for each performance metric as input to an unsupervised anomaly detection algorithm and executing the unsupervised anomaly detection algorithm to identify a plurality of potential anomalies in a multi-dimensional search space. Each performance metric corresponds to a respective dimension of the multi-dimensional search space. The method further includes identifying, from among the plurality of potential anomalies, one or more anomalies that exceed an anomaly score, in which one or more of the identified anomalies have a causal effect on multiple ones of the plurality of performance metrics.

Other features, functions, and aspects of the present disclosure will be evident from the Detailed Description that follows.

BRIEF DESCRIPTION OF THE DRAWINGS

The foregoing and other objects, features, and advantages will be apparent from the following description of embodiments of the present disclosure, as illustrated in the accompanying drawings, in which like reference characters refer to the same parts throughout the different views.

FIG. 5 is a flow diagram of an exemplary method of detecting impactful performance anomalies using ML.

DETAILED DESCRIPTION

Techniques are disclosed herein for detecting impactful performance anomalies using machine learning (ML). The disclosed techniques can include obtaining, for each performance metric of a system's workload, a training set of series difference data values ("diffs") based on a dynamic sensitivity threshold. Each diff can represent a difference between an observed data value from an observed set of time series data for the performance metric and a normalized data value from a corresponding set of normalized time series data. The disclosed techniques can further include applying the training set of series diffs for each performance metric as input to an unsupervised anomaly detection algorithm and executing the algorithm to detect, flag, or identify a plurality of potentially impactful anomalies in a multi-dimensional search space. Each performance metric can correspond to a respective dimension of the multi-dimensional search space. The disclosed techniques can further include detecting, flagging, or identifying one, some, or many impactful anomalies from among the plurality of potentially impactful anomalies that exceed an anomaly score, which can correspond (or be proportional) to the dynamic sensitivity threshold. In this way, impactful anomalies having a causal effect on multiple performance metrics of the system's workload can be identified in a manner that is less complex and less costly than prior multivariate approaches, as well as more helpful to a customer of the system.

Figure 1:
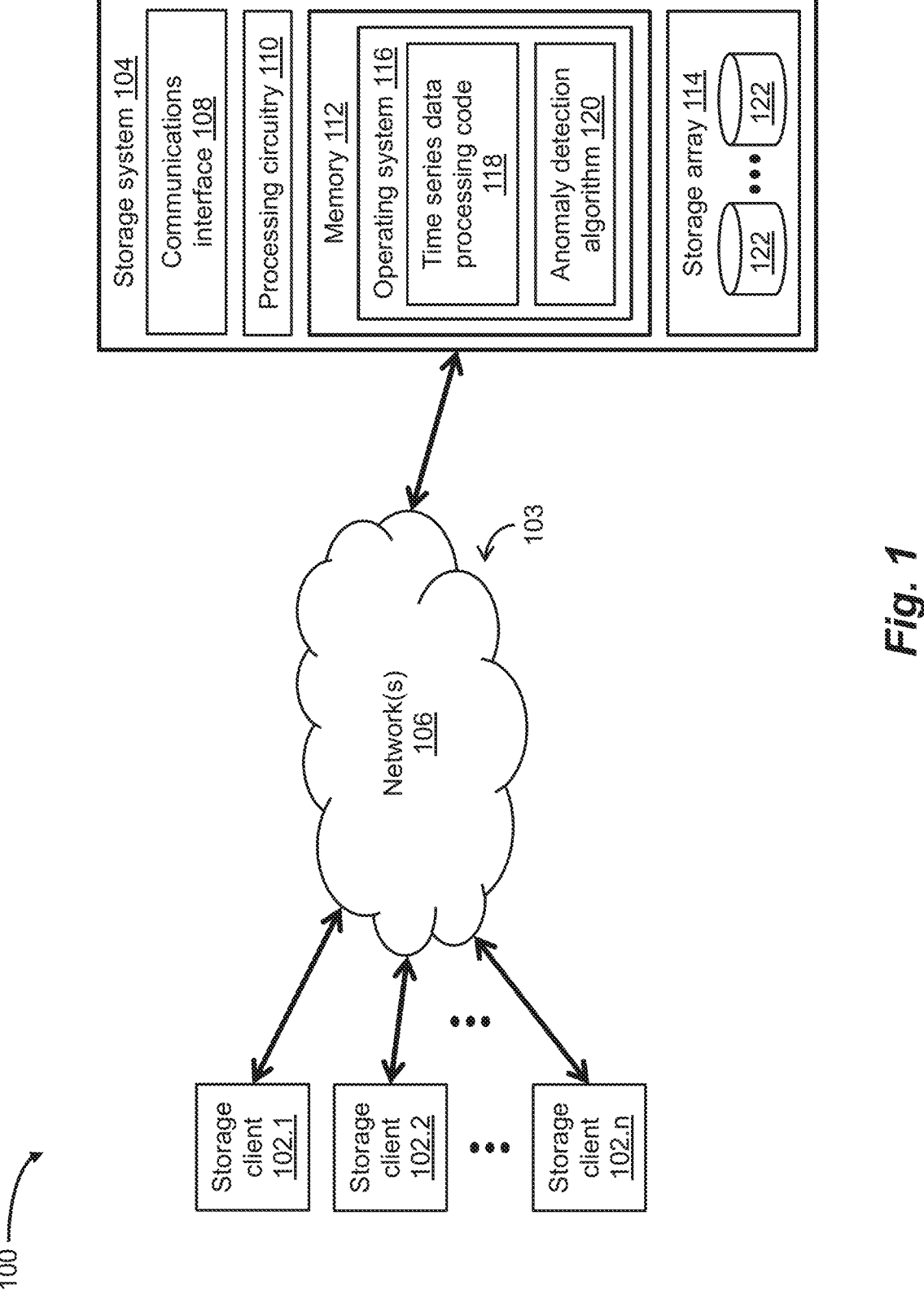
FIG. 1 is a block diagram of an exemplary storage environment, in which techniques can be practiced for detecting impactful performance anomalies using machine learning (ML)

FIG. 1 depicts an illustrative embodiment of an exemplary storage environment 100, in which techniques can be practiced for detecting impactful performance anomalies using ML. As shown in FIG. 1, the storage environment 100 can include a plurality of storage client computers ("storage client(s)") 102.1, 102.2, . . . , 102.n communicably coupled to a storage system 104 by a communications medium 103 that includes at least one network 106. For example, each of the plurality of storage clients 102.1, . . . , 102.n can be configured as an email server computer, a file server computer, a web server computer, and/or any other suitable client computer, server computer, or computerized device. The storage clients 102.1, . . . , 102.n can be further configured to provide, over the network(s) 106, storage input/output (IO) requests (e.g., small computer system interface (SCSI) commands, network file system (NFS) commands) to the storage system 104. Such storage IO requests (e.g., read requests, write requests) can direct the storage system 104 to read and/or write data blocks, data pages, data files, and/or any other suitable data elements from/to storage objects such as volumes (VOLs), logical units (LUs), and/or filesystems on a storage array 114. The storage system 104 can be configured as a standalone storage system including a single storage appliance, a clustered storage system including two or more storage appliances, a cloud-based storage system, or any other suitable storage system.

The communications medium 103 can be configured to interconnect the storage clients 102.1, . . . , 102.n with the storage system 104 to enable them to communicate and exchange data and control signaling. As shown in FIG. 1, the communications medium 103 can be illustrated as a "cloud" to represent different network topologies such as a storage area network (SAN) topology, a network-attached storage (NAS) topology, a direct-attached storage (DAS) topology, a local area network (LAN) topology, a metropolitan area network (MAN) topology, a wide area network (WAN) topology, or any suitable combination thereof. As such, the communications medium 103 can include copper-based data communications devices and cabling, fiber optic devices and cabling, wireless devices, and so on, or any suitable combination thereof.

As shown in FIG. 1, the storage system 104 can include a communications interface 108, processing circuitry 110, a memory 112, and the storage array 114. The communications interface 108 can include an Ethernet interface, an InfiniBand interface, a Fiber Channel interface, and/or any other suitable communications interface. The communications interface 108 can further include SCSI target adapters, network interface adapters, and/or any other suitable adapters for converting electronic, optical, and/or wireless signals received over the network(s) 106 to a form suitable for use by the processing circuitry 110. The processing circuitry 110 can be configured to process storage IO requests (e.g., read requests, write requests) from the respective storage clients 102.1, . . . , 102.n and store client data in a redundant array of independent disk (RAID) environment implemented on the storage array 114. The storage array 114 can include a plurality of storage devices 122, such as solid-state drives (SSDs), hard disk drives (HDDs), flash drives, hybrid drives, or any other suitable drives. The storage drives 122 can be configured to store VOLs, LUs, filesystems, and/or any other suitable storage objects for hosting data storage of client applications (e.g., email client applications, file client applications, web client applications) executing on one or more of the storage clients 102.1, . . . , 102.n. The memory 112 can include persistent memory (e.g., flash memory, magnetic memory) and non-persistent cache memory (e.g., dynamic random-access memory (DRAM), static random-access memory (SRAM)). The memory 112 can further include an operating system (OS) 116 such as a Linux operating system (OS), Unix OS, Windows OS, or any other suitable operating system. The memory 114 can be configured to store a variety of software constructs realized in the form of specialized code and algorithms (e.g., program instructions), including time series data processing code 118 and an anomaly detection algorithm 120. Such specialized code and algorithms can be executed by the processing circuitry 110 to carry out the techniques and/or methods disclosed herein.

In the context of the processing circuitry 110 being configured to execute specialized code and algorithms (e.g., program instructions) out of the memory 112, a computer program product can be configured to deliver all or a portion of the program instructions and data stored and/or maintained on the memory 112 to the processing circuitry 110. Such a computer program product can include one or more non-transient computer-readable storage media, such as a magnetic disk, a magnetic tape, a compact disk (CD), a digital versatile disk (DVD), an optical disk, a flash drive, a solid-state drive (SSD), a secure digital (SD) chip or device, an application specific integrated circuit (ASIC), a field programmable gate array (FPGA), and so on. The non-transient computer-readable storage media can be encoded with sets of program instructions and data for performing, when executed by the processing circuitry 110, the various techniques and/or methods disclosed herein.

During operation, the disclosed techniques for detecting impactful performance anomalies using ML can be performed in multiple stages, namely, a univariate stage and a multivariate stage. The univariate stage of the disclosed techniques can include collecting or sampling, at regular time intervals, a plurality of performance metrics of a workload of the storage system 104 and generating and observing a set of unlabeled time series data ("observed data") for each performance metric. The univariate stage can further include normalizing the observed data values for each performance metric to generate a set of normalized time series data ("normalized data") for the performance metric. The univariate stage can further include obtaining, for each performance metric, a training set of series difference data values ("diffs") based on a dynamic sensitivity threshold, in which each diff in the training set represents a difference between an observed data value from the set of observed data for the performance metric and a normalized data value from the corresponding set of normalized data.

Having performed the univariate stage, the multivariate stage of the disclosed techniques can be performed by applying the training set of series diffs for each performance metric as input to an unsupervised anomaly detection algorithm, such as an isolation forest algorithm or any other suitable anomaly detection algorithm. The multivariate stage can include executing the unsupervised anomaly detection algorithm (e.g., isolation forest algorithm) to detect, flag, or identify a plurality of potentially impactful anomalies in a multi-dimensional search space, in which each performance metric corresponds to a respective dimension of the multi-dimensional search space. The multivariate stage can further include detecting, flagging, or identifying one, some, or many impactful anomalies from among the plurality of potentially impactful anomalies that exceed an anomaly score, which can correspond (or be proportional) to a dynamic sensitivity threshold employed in the univariate stage or any other suitable threshold. In this way, impactful anomalies having a causal effect on multiple performance metrics of a storage system's workload can be identified in a manner that is less complex and less costly than prior multivariate approaches, as well as more helpful to a customer of the storage system 104.

The disclosed techniques for detecting impactful performance anomalies using ML will be further understood with reference to the following illustrative example and FIGS. 1-4b. In this example, it is assumed that the univariate stage of the disclosed techniques is configured to sample, at regular time intervals (e.g. five (5) minute time intervals), two performance metrics of a workload of the storage system 104 (see FIG. 1), namely, the latency of the workload (the "latency performance metric") and the input/output operations per second (IOPS) of the workload (the "IOPS performance metric"). Further in this example, it is assumed that the multivariate stage of the disclosed techniques employs an unsupervised anomaly detection algorithm configured to perform an isolation forest technique to identify impactful anomalies from among a plurality of potentially impactful anomalies that exceed an anomaly score.

Figures 2A, 2B:
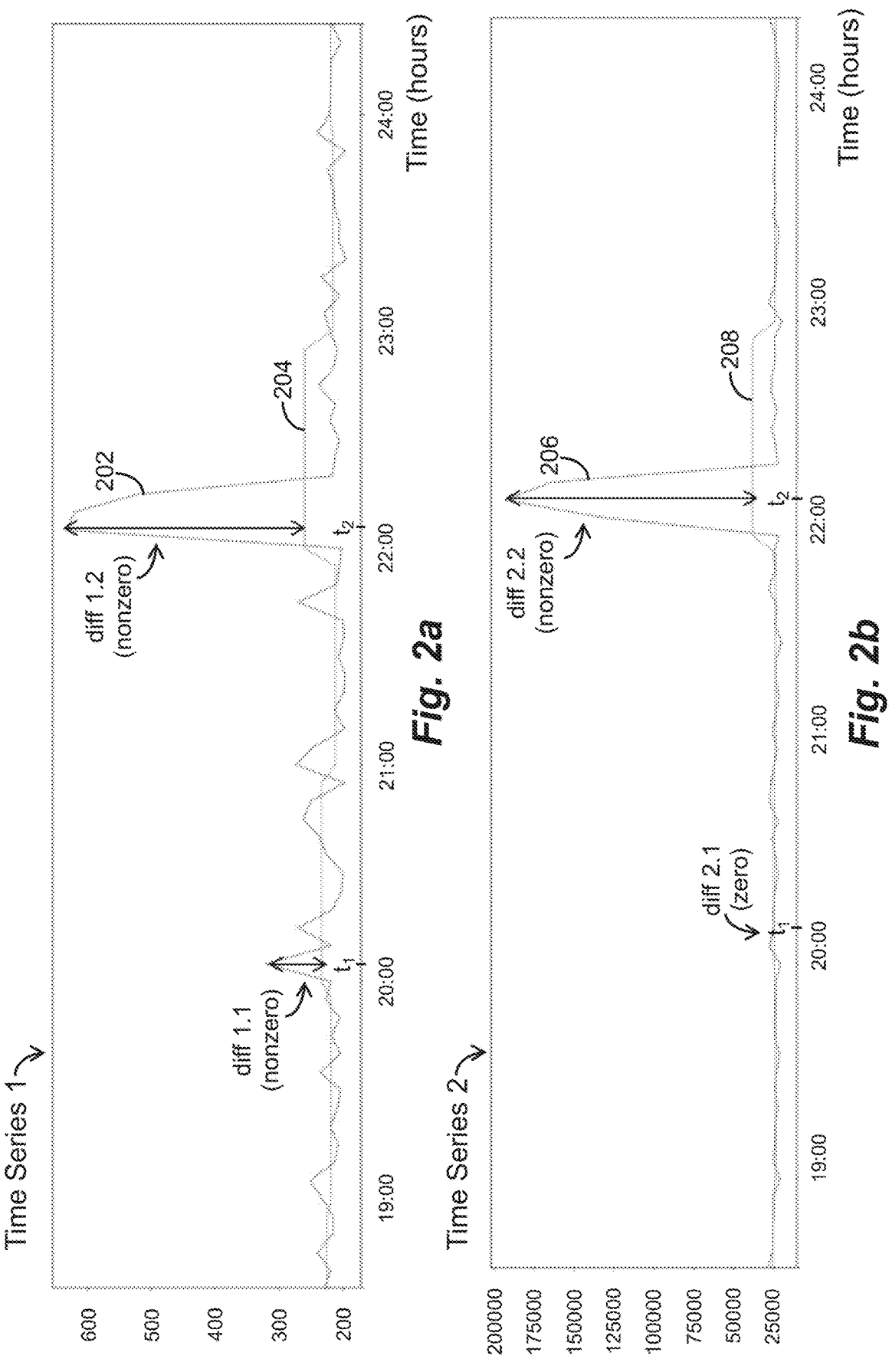
FIG. 2a is a diagram of exemplary time series data for a first performance metric of a system's workload and corresponding normalized time series data for the first performance metric.
FIG. 2b is a diagram of exemplary time series data for a second performance metric of the system's workload and corresponding normalized time series data for the second performance metric.

FIG. 2a depicts time series data ("Time Series 1") for the latency performance metric of the storage system's workload. In this example, the processing circuitry 110 of the storage system 104 executes the time series data processing code 118 to perform steps of the univariate stage of the disclosed techniques, including sampling the latency performance metric at regular time intervals (e.g., 5-minute time intervals) over the course of a multi-day (e.g., 21-day) period to generate a set of unlabeled time series data 202 (i.e., "observed data") for the latency performance metric. As shown in FIG. 2a, the observed data 202 for the latency performance metric is illustrated over about a six (6) hour time interval within the 21-day period. As further shown in FIG. 2a, exemplary spikes in the observed data 202 are illustrated at time "$t_1$" and time "$t_2$" within the 6-hour time interval. Having generated the observed data 202 for the latency performance metric, the processing circuitry 110 further executes the time series data processing code 118 to normalize the observed data 202, thereby generating a set of normalized time series data 204 (i.e., "normalized data") for the latency performance metric. For example, such normalized data can be generated using any suitable data smoothing technique or algorithm. Once the observed data 202 and the normalized data 204 have been generated for the latency performance metric, the processing circuitry 110 executes the time series data processing code 118 to obtain, for the latency performance metric, a training set of series difference data values (i.e., "cliffs") including diff 1.1 and diff 1.2 based on a sensitivity threshold. As shown in FIG. 2a, diff 1.1 represents, at time $t_1$, a nonzero difference between an observed data value from the observed data 202 and a normalized data value from the normalized data 204. Similarly, diff 1.2 represents, at time $t_2$, a nonzero difference between an observed data value from the observed data 202 and a normalized data value from the normalized data 204. In this example, the sensitivity threshold can be learned dynamically by applying a data smoothing algorithm to the time series data. In addition, or alternatively, the sensitivity threshold can correspond to one or more standard deviations from the norm or any other suitable threshold value. It is noted that, over the 21-day period, the training set of series diffs for the latency performance metric can include the nonzero diff 1.1, the nonzero diff 1.2, up to a zero or nonzero diff 1.p (see FIG. 3).

FIG. 2b depicts time series data ("Time Series 2") for the IOPS performance metric of the storage system's workload. In this example, the processing circuitry 110 executes the time series data processing code 118 to perform additional steps of the univariate stage of the disclosed techniques, including sampling the IOPS performance metric at regular 5-minute time intervals over the course of the 21-day period to generate a set of unlabeled time series data 206 (i.e., "observed data") for the IOPS performance metric. As shown in FIG. 2b, the observed data 206 for the latency performance metric is illustrated over about the 6-hour time interval within the 21-day period. As further shown in FIG. 2b, an exemplary spike in the observed data 206 is illustrated at time "$t_2$" within the 6-hour time interval. It is noted that no spike in the observed data 206 is illustrated at time "$t_1$" within the 6-hour time interval. Having generated the observed data 206 for the IOPS performance metric, the processing circuitry 110 further executes the time series data processing code 118 to normalize the observed data 206, thereby generating a set of normalized time series data 208 (i.e., "normalized data") for the IOPS performance metric. Once the observed data 206 and the normalized data 208 have been generated for the IOPS performance metric, the processing circuitry 110 executes the time series data processing code 118 to obtain, for the IOPS performance metric, a training set of series difference data values (i.e., "diffs") including diff 2.1 and diff 2.2 based on a sensitivity threshold learned dynamically from the time series data. In addition, or alternatively, the sensitivity threshold can correspond to one or more standard deviations from the norm or any other suitable threshold value. As shown in FIG. 2b, diff 2.2 represents, at time $t_2$, a nonzero difference between an observed data value from the observed data 206 and a normalized data value from the normalized data 208. However, diff 2.1 represents, at time $t_1$, a zero difference between an observed data value from the observed data 206 and a normalized data value from the normalized data 208. In other words, the training set of series diffs for the IOPS performance metric (as well as the latency performance metric or any other suitable performance metric) can contain one or more diffs having zero numerical values (i.e., diff=0) or nonzero numerical values (i.e., diff>0 or diff<0). It is noted that, over the 21-day period, the training set of series diffs for the IOPS performance metric can contain the zero diff 2.1, the nonzero diff 2.2, up to a zero or nonzero diff 2.p (see FIG. 3).

In this example, the processing circuitry 110 of the storage system 104 executes the time series data processing code 118 to perform steps of the multivariate stage of the disclosed techniques, including tabularizing the training set of diff values 1.1, 1.2, . . . , 1.p for the latency performance metric and the training set of diff values 2.1, 2.2, . . . , 2.p for the IOPS performance metric, and applying the tabularized diff values 1.1, 1.2, . . . , 1.p, 2.1, 2.2, . . . , 2.p as input to the anomaly detection algorithm 120.

Figure 3:
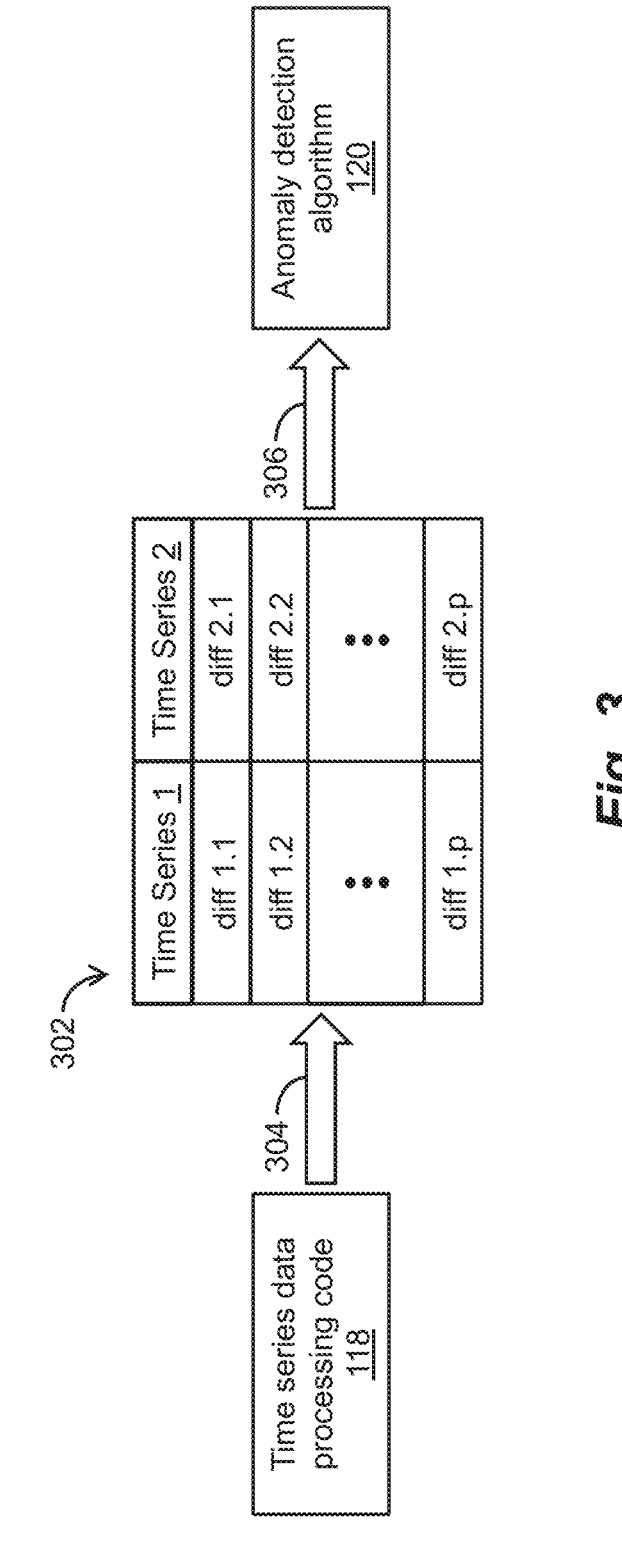
FIG. 3 is a block diagram illustrating the generation, by executing exemplary time series data processing code, of a table containing a first training set of series difference data values ("diffs") for the first performance metric of FIG. 2a and a second training set of series diffs for the second performance metric of FIG. 2b, and the application of the first and second training sets of series diffs to an exemplary anomaly detection algorithm.

FIG. 3 depicts the tabularization of the diff values 1.1, 1.2, . . . , 1.p, 2.1, 2.2, . . . , 2.p (as illustrated by an arrow 304) into a table 302 and the application of the diff values 1.1, 1.2, . . . , 1.p, 2.1, 2.2, . . . , 2.p (as illustrated by an arrow 306) as input from the table 302 to the anomaly detection algorithm 120. In this example, the anomaly detection algorithm 120 is embodied as the isolation forest algorithm. Having applied the diff values 1.1, 1.2, . . . , 1.p, 2.1, 2.2, . . . , 2.p to the anomaly detection algorithm 120, the processing circuitry 110 executes the anomaly detection algorithm 120 to identify potentially impactful anomalies in a multi-dimensional (e.g., 2-dimensional) search space, in which the latency performance metric and the IOPS performance metric correspond to a first dimension and a second dimension, respectively, of the 2-dimensional search space. As such, the numerical values of diff 1.1 and diff 2.1 represent the coordinates of a first data point in the 2-dimensional search space, the values of diff 1.2 and diff 2.2 represent the coordinates of a second data point in the 2-dimensional search space, and so on, up to the values of diff 1.p and diff 2.p, which represent the coordinates of a "$P^{th}$" data point in the 2-dimensional search space.

In this example, the processing circuitry 110 executes the time series data processing code 118 to perform additional steps of the multivariate stage of the disclosed techniques, including identifying impactful anomalies from among the potentially impactful anomalies identified by the anomaly detection algorithm 120 (e.g., isolation forest algorithm). Such impactful anomalies are those that exceed an anomaly score, which can correspond (or be proportional) to a dynamically learned sensitivity threshold employed in the univariate stage of the disclosed techniques.

Figures 4A, 4B:
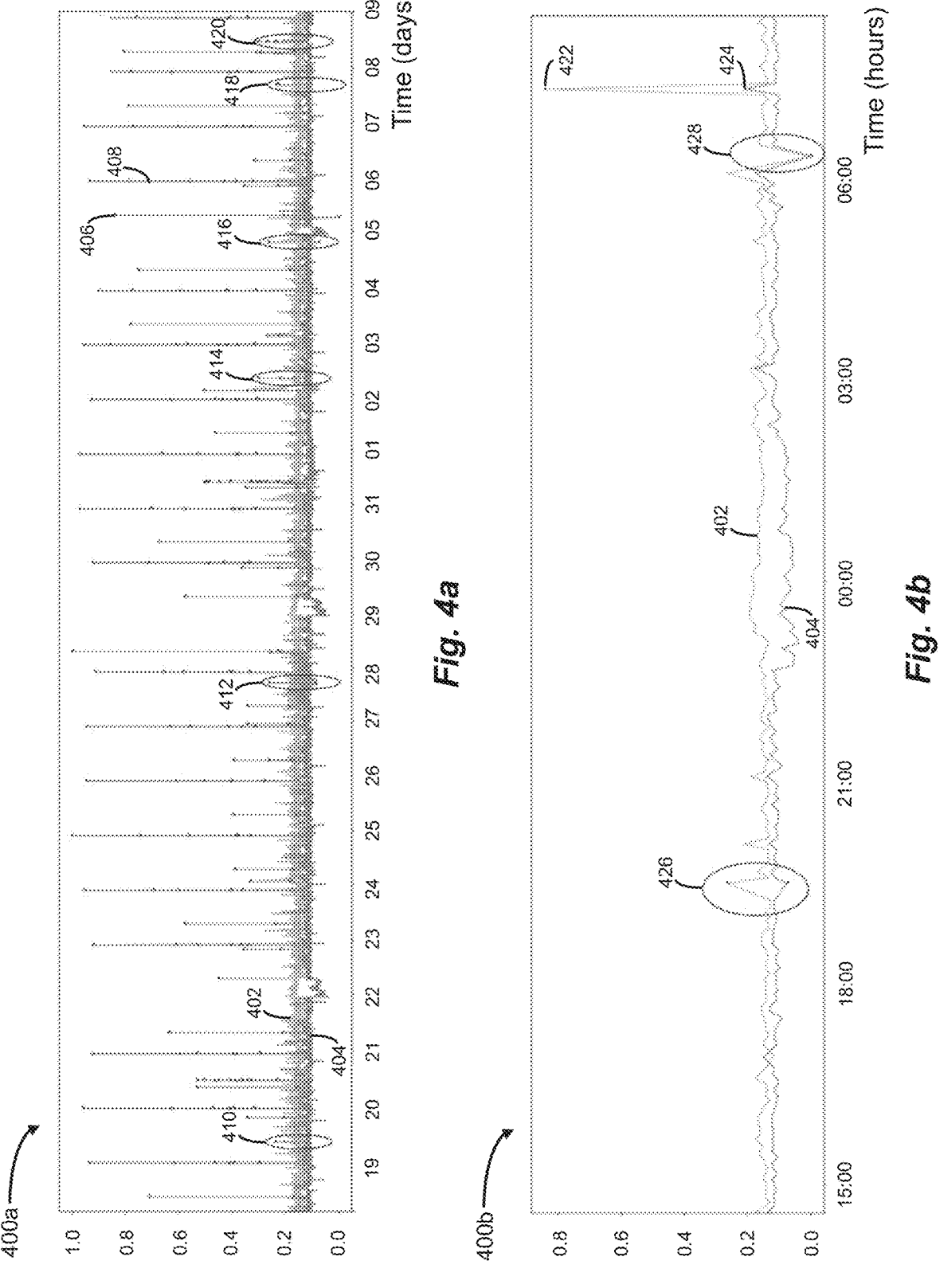
FIG. 4a is a diagram of an exemplary output of the anomaly detection algorithm of FIG. 3 over a multi-day period.
FIG. 4b is a diagram of an exemplary output of the anomaly detection algorithm of FIG. 3 over a portion of a single-day time interval.

FIG. 4a depicts a first output 402 and a second output 404 generated by the anomaly detection algorithm 120 over the 21-day period, in which the first output 402 corresponds to the first dimension (i.e., the latency performance metric) of the 2-dimensional search space and the second output 404 corresponds to the second dimension (i.e., the IOPS performance metric) of the 2-dimensional search space. As shown in FIG. 4a, exemplary spikes in the first and second outputs 402 and 404 are illustrated over the 21-day period, such as a spike 406 in the first output 402 and a spike 408 in the second output 404. As further shown in FIG. 4a, each potentially impactful anomaly in the 2-dimensional space is illustrated by a first dot (not numbered) on a spike in the first output 402 and a corresponding second dot (not numbered) on a spike in the second output 404. Such potentially impactful anomalies include those at reference numerals 410, 412, 414, 416, 418, 420.

FIG. 4b depicts the first output 402 and the second output 404 generated by the anomaly detection algorithm 120 over a portion of a single-day time interval, showing an enlarged view of several potentially impactful anomalies in the 2-dimensional space within the 21-day period. As in FIG. 4a, each potentially impactful anomaly is illustrated in FIG. 4b by a first dot on a spike in the first output 402 and a corresponding second dot on a spike in the second output 404. Such potentially impactful anomalies include a potentially impactful anomaly illustrated by a first dot 422 on a spike in the first output 402 and a second dot 424 on a spike in the second output 404, as well as two potentially impactful anomalies at reference numerals 426, 428.

As described herein, impactful anomalies can have a causal effect on multiple performance metrics of a storage system's workload. Such impactful anomalies can include those identified at reference numerals 426, 428, each of which appear to have a causal effect on the latency performance metric and the IOPS performance metric. In this example, having identified the impactful anomalies 426, 428, the storage system 104 can be configured to perform an automated investigation of the impactful anomaly 426, which appears to be characterized by an increase in latency coupled with a decrease in IOPS, as well as an automated investigation of the impactful anomaly 428, which appears to be characterized by a decrease in latency coupled with a decrease in IOPS. It is noted that impactful anomalies such as the impactful anomaly 426 and the impactful anomaly 428 typically cannot be identified using a strict univariate approach to anomaly detection. Results of such automated investigations of impactful anomalies can be employed to carry out automated and/or remedial actions to produce a more effective storage solution, such as increasing resources of the storage system 104, reducing workloads on the storage system 104, moving workloads to a different storage system, balancing a load on the storage system 104 by rescheduling workloads to be executed at different times, and so on.

An exemplary method of detecting impactful performance anomalies using ML is described below with reference to FIG. 5. As depicted in block 502, for each performance metric from among a plurality of performance metrics of a storage system's workload, a training set of series difference data values ("diffs") is obtained based on a sensitivity threshold, in which each diff represents a difference between an observed data value from an observed set of time series data for the performance metric and a normalized data value from a corresponding set of normalized time series data. As depicted in block 504, the training set of series diffs for each performance metric is applied as input to an unsupervised anomaly detection algorithm. As depicted in block 506, the unsupervised anomaly detection algorithm is executed to identify a plurality of potentially impactful anomalies in a multi-dimensional search space, in which each performance metric corresponds to a respective dimension of the multi-dimensional search space. As depicted in block 508, from among the plurality of potentially impactful anomalies, one, some, or many impactful anomalies are identified that exceed an anomaly score, in which one or more of the impactful anomalies have a causal effect on multiple ones of the plurality of performance metrics.

Illustrative embodiments of systems and methods of detecting impactful performance anomalies using ML have been described herein. The described systems and methods can employ the two-stage approach to detecting impactful performance anomalies. The first stage (i.e., the univariate stage) can employ a multiple univariate anomaly detection technique. The second stage (i.e., the multivariate stage) can employ an unsupervised anomaly detection algorithm to combine multiple performance metrics of the storage system's workload, treating them as numerical features that the unsupervised anomaly detection algorithm can use to construct a multi-dimensional search space. It is noted that the unsupervised anomaly detection algorithm can be implemented not only as an isolation forest algorithm, but also a Gaussian mixture model (GMM) algorithm, a least-squares anomaly (LSA) detection algorithm, or any other suitable anomaly detection algorithm.

In the described systems and methods, an unsupervised anomaly detection algorithm like the isolation forest algorithm can be executed to explicitly identify impactful anomalies rather than profiling normal system behavior for each performance metric and detecting anomalous deviations from the normal profile, as in prior approaches. Further, the identified anomalies can represent multivariate anomalies, which may more likely result from significant and adverse system events. The unsupervised anomaly detection algorithm (e.g., isolation forest algorithm) can be configured based on the assumption that the identified anomalies correspond to the data points that are few and different. The isolation forest algorithm can employ a space-partitioning approach, much like how random forests can be employed in regression or classification tasks. The isolation forest algorithm can build an isolation forest based on decision trees, each of which can have access to a sub-sample of the training data. To create branches of a decision tree, the isolation forest algorithm can select a random feature and choose a random split value (e.g., between minimum and maximum values) for the random feature. If a given observed data value for the random feature is less than the random split value, then it can follow a right branch of the decision tree. If the given observed data value for the random feature is greater than the random split value, then it can follow a left branch of the decision tree. Such creation of branches of the decision tree can continue until a single outlier data point becomes isolated or a specified depth of the decision tree is reached. Outlier data points are expected to be less frequent and positioned farther away from normal data points in the multi-dimensional search space. Using the space-partitioning approach, such outlier data points can be located closer to the root of the decision tree and have a shorter average path length, which corresponds to one or more edges that must be traversed from the root of the decision tree to a terminal tree node corresponding to the given observed data value. More partitions can be required to isolate a normal data point in the multi-dimensional search space, while fewer partitions can be required to isolate an abnormal, anomalous, or outlier data point in the multi-dimensional search space. An anomaly score can be employed to facilitate decision making in the creation of the decision tree. For the isolation forest algorithm, such an anomaly score can be expressed, as follows:

$$s(x, n) = 2^{-\frac{E(h(x))}{c(n)}}, \tag{1}$$

in which "x" corresponds to an observed data value, "h(x)" corresponds to a path length of the observed data value x, "c(n)" corresponds to an average path length of unsuccessful search in a binary search tree, and "n" corresponds to the number of external tree nodes. The number of anomalies identified using the isolation forest algorithm can be controlled by the anomaly score, which can represent the sensitivity of the isolation forest algorithm. Like other decision tree ensemble techniques (e.g., random forest techniques), the isolation forest algorithm can be more efficient in training and inference time, as well as more amenable to parallelization. Further details pertaining to the isolation forest algorithm can be found in the publication by Liu, F. T., Ting, K. M., and Zhou, Z. H. entitled ISOLATION FOREST in Data Mining, ICDM '08, Eighth IEEE International Conference, pages 413-422 (2008).

In the univariate stage, a set of unlabeled time series data can be processed separately for each performance metric. Further, a smoothing algorithm, such as an exponential smoothing algorithm or an anomaly-weighted exponential smoothing algorithm, can be executed to generate a normalized curve out of the training data that takes into consideration trend and seasonality effects. As employed herein, a "trend" refers to a continuous increase or decrease in the value of a performance metric, and "seasonality" refers to periodic or cyclical (e.g., hourly, daily, weekly, yearly) patterns in a performance metric's value, typically rising above and falling below a baseline. A series of diffs between observed data values and normalized data values can be extracted for each performance metric (i.e., each dimension of the multi-dimensional search space) based on a sensitivity threshold, which can be learned dynamically by applying the smoothing algorithm to the time series data. In the multivariate stage, a series of diffs for each performance metric can be stored to a table, in which each column of the table corresponds to a respective dimension of the multi-dimensional search space. Each column of the table can contain, for a particular performance metric, numerical diff values that capture time-related features of the performance metric's time series data. The unsupervised anomaly detection algorithm (e.g., isolation forest algorithm) can be executed against the table of diff values to identify impactful anomalies that exceed the anomaly score, which can correspond (or be proportional) to a dynamically learned sensitivity threshold employed in the univariate stage.

Several definitions of terms are provided below for the purpose of aiding the understanding of the foregoing description, as well as the claims set forth herein.

As employed herein, the term "storage system" is intended to be broadly construed to encompass, for example, private or public cloud computing systems for storing data, as well as systems for storing data comprising virtual infrastructure and those not comprising virtual infrastructure.

As employed herein, the terms "client," "host," and "user" refer, interchangeably, to any person, system, or other entity that uses a storage system to read/write data.

As employed herein, the term "storage device" may refer to a storage array including multiple storage devices. Such a storage device may refer to any non-volatile memory (NVM) device, including hard disk drives (HDDs), solid state drives (SSDs), flash devices (e.g., NAND flash devices, NOR flash devices), and/or similar devices that may be accessed locally and/or remotely (e.g., via a storage attached network (SAN)). A storage array (drive array, disk array) may refer to a storage system used for block-based, file-based, or object storage. Storage arrays can include, for example, dedicated storage hardware containing HDDs, SSDs, and/or all-flash drives. A storage entity may be a filesystem, an object storage, a logical unit (LU), a logical unit number (LUN), a logical volume (LV), a virtual volume (VVOL), a logical device, a virtualized device, a physical device, and/or a storage medium. An LU may be a logical entity provided by a storage system for accessing data from the storage system and may be used interchangeably with a logical volume. An LU or LUN may be used interchangeably with each other. A LUN may be a logical unit number for identifying an LU and may also refer to one or more virtual disks or virtual LUNs, which may correspond to one or more virtual machines. A physical storage unit or device may be a physical entity such as a drive or disk or an array of drives or disks for storing data in storage locations that can be accessed by addresses. A physical storage unit or device may be used interchangeably with a physical volume.

As employed herein, the term "storage medium" may refer to one or more storage media such as a hard drive, a combination of hard drives, flash storage, a combination of flash storage, a combination of hard drives, flash storage, and other storage devices, and/or any other suitable types or combinations of computer readable storage media. A storage medium may also refer to both physical and logical storage media, include multiple levels of virtual-to-physical mappings, and include an image or disk image. A storage medium may be computer-readable and may be referred to as a computer-readable program medium.

As employed herein, the term "IO request" or "IO" may be used to refer to an input or output request such as a data read request or data write request.

As employed herein, the terms, "such as," "for example," "e.g.," "exemplary," and variants thereof describe non-limiting embodiments and mean "serving as an example, instance, or illustration." Any embodiments described herein using such phrases and/or variants are not necessarily to be construed as preferred or more advantageous over other embodiments, and/or to exclude the incorporation of features from other embodiments. In addition, the term "optionally" is employed herein to mean that a feature or process, etc., is provided in certain embodiments and not provided in other certain embodiments. Any embodiment of the present disclosure may include a plurality of "optional" features unless such features conflict with one another.

While various embodiments of the present disclosure have been particularly shown and described, it will be understood by those skilled in the art that various changes in form and details may be made therein without departing from the scope of the present disclosure, as defined by the appended claims.

What is claimed is:

1. A computer implemented method of detecting performance anomalies using machine learning, the computer implemented method comprising:

causing processing circuitry to execute instructions encoded on a non-transitory computer-readable medium such that, upon execution, the processing circuitry performs operations of in a plurality of successive stages including a first univariate stage and a second multivariate stage, wherein, in the first univariate stage, the processing circuitry executes the instructions to perform operations of:

for each performance metric from among a plurality of performance metrics of a workload of a storage system, obtaining a training set of difference data values based on a sensitivity threshold, each difference data value representing a difference between an observed data value from a set of time series observed data for the performance metric and a normalized data value from a set of time series normalized data for the performance metric;

wherein, in the second multivariate stage, the processing circuitry executes the instructions to perform operations of:

applying the training set of difference data values for each performance metric as input to an unsupervised anomaly detection algorithm;

executing the unsupervised anomaly detection algorithm to identify a plurality of potential anomalies in a multi-dimensional search space each performance metric corresponding to a respective dimension of the multi-dimensional search space; and identifying, from among the plurality of potential anomalies, one or more anomalies that exceed an anomaly score, one or more of the identified anomalies having a causal effect on multiple ones of the plurality of performance metrics; and wherein the processing circuitry further executes the instructions to perform operations of:

based on the causal effect of the identified anomalies on multiple ones of the plurality of performance metrics, performing one or more of:

reducing the workload of the storage system;

moving the workload to a different storage system;

increasing resources of the storage system; and balancing a load of the storage system by rescheduling multiple workloads of the storage system to be executed at different times.

2. The method of claim 1 further comprising:

dynamically learning the sensitivity threshold by applying a data smoothing algorithm to the set of time series observed data.

3. The method of claim 1 further comprising:

generating identifying information of the identified anomalies for use in performing one or more automated actions associated with the system.

4. The method of claim 1 further comprising:

for each performance metric, sampling the performance metric at regular time intervals over a course of a specified period to generate the set of time series observed data.

5. The method of claim 4 further comprising:

for each performance metric, normalizing the set of time series observed data to generate the set of time series normalized data.

6. The method of claim 5 further comprising:

tabularizing the difference data values for each performance metric to generate a table containing the difference data values for each performance metric.

7. The method of claim 6 further comprising:

applying the difference data values contained in the table as input to the unsupervised anomaly detection algorithm, the table including a plurality of columns, each column containing the difference data values for a respective one of the plurality of performance metrics.

8. The method of claim 7 wherein the executing of the unsupervised anomaly detection algorithm includes executing the Isolation Forest algorithm against the difference data values contained in the table.

9. A system for detecting anomalies using machine learning, comprising:

a memory; and processing circuitry configured to execute program instructions out of the memory to perform operations in a plurality of successive stages including a first univariate stage and a second multivariate stage, wherein, in the first univariate stage, the processing circuitry executes the program instructions out of the memory to perform operations of:

for each performance metric from among a plurality of performance metrics of a workload of a storage system, obtain a training set of difference data values based on a sensitivity threshold, each difference data value representing a difference between an observed data value from a set of time series observed data for the performance metric and a normalized data value from a set of time series normalized data for the performance metric;

wherein, in the second multivariate stage, the processing circuitry executes the program instructions out of the memory to perform operations of:

apply the training set of difference data values for each performance metric as input to an unsupervised anomaly detection algorithm;

execute the unsupervised anomaly detection algorithm to identify a plurality of potential anomalies in a multi-dimensional search space each performance metric corresponding to a respective dimension of the multi-dimensional search space; and identify, from among the plurality of potential anomalies, one or more anomalies that exceed an anomaly score, one or more of the identified anomalies having a causal effect on multiple ones of the plurality of performance metrics; and wherein the processing circuitry further executes the program instructions out of the memory to perform operations of:

based on the causal effect of the identified anomalies on multiple ones of the plurality of performance metrics, performing one or more of:

reducing the workload of the storage system;

moving the workload to a different storage system;

increasing resources of the storage system; and balancing a load of the storage system by rescheduling multiple workloads of the storage system to be executed at different times.

10. The system of claim 9 wherein the processing circuitry is further configured to execute the program instructions out of the memory to dynamically learn the sensitivity threshold by applying a data smoothing algorithm to the set of time series observed data.

11. The system of claim 10 wherein the anomaly score corresponds or is proportional to the dynamically learned sensitivity threshold.

12. The system of claim 9 wherein the processing circuitry is further configured to execute the program instructions out of the memory to generate identifying information of the identified anomalies for use in performing one or more automated actions associated with the system.

13. The system of claim 9 wherein the processing circuitry is further configured to execute the program instructions out of the memory, for each performance metric, to sample the performance metric at regular time intervals over a course of a specified period to generate the set of time series observed data.

14. The system of claim 13 wherein the processing circuitry is further configured to execute the program instructions out of the memory, for each performance metric, to normalize the set of time series observed data to generate the set of time series normalized data.

15. The system of claim 14 wherein the processing circuitry is further configured to execute the program instructions out of the memory to tabularize the difference data values for each performance metric to generate a table containing the difference data values for each performance metric.

16. The system of claim 15 wherein the processing circuitry is further configured to execute the program instructions out of the memory to apply the difference data values contained in the table as input to the unsupervised anomaly detection algorithm, the table including a plurality of columns, each column containing the difference data values for a respective one of the plurality of performance metrics.

17. The system of claim 16 wherein the processing circuitry is further configured to execute the program instructions out of the memory to execute the unsupervised anomaly detection algorithm against the difference data values contained in the table.

18. The system of claim 9 wherein the sensitivity threshold corresponds to a number of standard deviations from a norm of the time series observed data for the performance metric.

19. A computer program product including a set of non-transitory, computer-readable media having instructions that, when executed by processing circuitry, cause the processing circuitry to perform a method comprising:

performing operations in a plurality of successive stages including a first univariate stage and a second multivariate stage, wherein, in the first univariate stage, the method comprises:

for each performance metric from among a plurality of performance metrics of a workload of a storage system, obtaining a training set of difference data values based on a sensitivity threshold, each difference data value representing a difference between an observed data value from a set of time series observed data for the performance metric and a normalized data value from a set of time series normalized data for the performance metric;

wherein, in the second multivariate stage, the method comprises:

applying the training set of difference data values for each performance metric as input to an unsupervised anomaly detection algorithm;

executing the unsupervised anomaly detection algorithm to identify a plurality of potential anomalies in a multi-dimensional search space each performance metric corresponding to a respective dimension of the multi-dimensional search space; and identifying, from among the plurality of potential anomalies, one or more anomalies that exceed an anomaly score, one or more of the identified anomalies having a causal effect on multiple ones of the plurality of performance metrics; and wherein the method comprises:

based on the causal effect of the identified anomalies on multiple ones of the plurality of performance metrics, performing one or more of:

reducing the workload of the storage system;

moving the workload to a different storage system;

increasing resources of the storage system; and balancing a load of the storage system by rescheduling multiple workloads of the storage system to be executed at different times.

*   *   *   *   *